Figure 2:
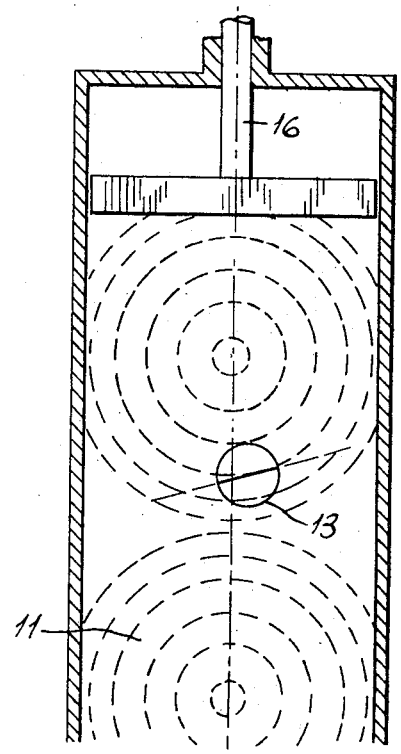

United States Patent [19]
Moore

[11] 3,708,767
[45] Jan. 2, 1973

[54] WAVEGUIDE COUPLING DEVICE
[75] Inventor: William Stanley Moore, Chilwell, England
[73] Assignee: National Research Development Corporation, London, England
[22] Filed: May 20, 1971
[21] Appl. No.: 145,393

[30] Foreign Application Priority Data
  May 27, 1970  Great Britain.....................25,513/70

[52] U.S. Cl...................333/24 R, 333/7, 333/21 A, 333/27, 333/83 R
[51] Int. Cl..............................................H01p 5/12
[58] Field of Search..........333/6, 7, 10, 11, 21, 21 A, 333/24, 27, 83, 98

[56] References Cited

UNITED STATES PATENTS 2,517,731  8/1950  Sproull.............................333/6 X
2,936,430  5/1960  Marie.............................333/21 R X

*Primary Examiner*—Herman Karl Saalbach
*Assistant Examiner*—Marvin Nussbaum
*Attorney*—Cushman, Darby & Cushman

[57] ABSTRACT

A waveguide coupling device has first and second waveguides coupled to opposite ends of a resonant cavity by respective irises. One waveguide has two relatively broad and two relatively narrow faces, the corresponding iris being in one of the broad faces and displaced from the axis thereof in such a manner that displacement of standing waves along the axis of this waveguide causes rotation of the plane of polarization of a field fed into the cavity through the iris. A tuning element, having a non-circular cross-section, passes into the cavity through one of the irises. Rotation of the tuning element about its axis thus varies the geometry of the cavity.

10 Claims, 2 Drawing Figures

PATENTED JAN 2 1973

3,708,767

WAVEGUIDE COUPLING DEVICE

The present invention relates to a device for coupling two waveguides.

It is known to provide a two port cavity resonator which uses crossed modes to isolate to a degree the input waveguide from the output guide. Previously, the resonator has been connected to first and second waveguides each having two relatively broad faces and two relatively narrow faces. The resonant cavity has been coupled at one end thereof to the first waveguide by an iris in the broad face of the waveguide, and coupled at the other end of the cavity to the second waveguide by an iris in the narrow face of the waveguide. The bimodal cavity has been adjusted in the past by a combination of capacitive and resistive plugs protruding into the cavity at right angles to the axis of propagation. When a degree of isolation between the input and output guides has been achieved, an output from the device can be obtained by any physical phenomenon taking place within the resonator which rotates the plane of polarization of the field in the resonator. Examples of such phenomena are the Hall effect, electron spin resonance, and Faraday rotation.

It is one object of the invention to provide a bimodal cavity coupling two waveguides and having improved means for adjusting the balance of the two modes in the cavity.

In accordance with a first aspect of the present invention there is provided a waveguide coupling device comprising first and second waveguides, a resonant cavity coupled at one end thereof to the first waveguide by a first iris in a face of the waveguide, and coupled at the other end of the cavity to the second waveguide by a second iris in a face of the second waveguide, the arrangement being such that the resonant cavity is coupled to one of the waveguides in a mode which is orthogonal to the mode in which it is coupled to the other waveguide, and a tuning element passing into the cavity through one of the irises substantially along the axis of propagation of the cavity, the tuning element having a non-circular cross-section and being rotatable to allow adjustment of coupling between the two waveguides.

It is preferred that the tuning element comprises a dielectric rod mounted co-axial with the axis of propagation of the cavity and having a cross-section which departs from a circular cross-section by a flat along a chord of the circle, or by being elliptical. Alternatively, the tuning element may comprise a dielectric strip of rectangular cross-section.

According to the present invention in a second aspect there is provided a waveguide coupling device comprising a first waveguide having a pair of relatively broad opposite faces and a pair of relatively narrow opposite faces, a resonant cavity coupled at one end thereof to the first waveguide by a first iris in a broad face of the waveguide, a second waveguide coupled to the other end of the cavity by a second iris in a face of the waveguide, and means for varying, in operation, the position of standing waves along the axis of the first waveguide relative to the first iris, the center of the first iris being displaced from the longitudinal center line of said broad face of the first waveguide in such a manner that displacement of standing waves along the axis of the first waveguide causes rotation of the plane of polarization of a field fed into the cavity through the first iris.

The said means for varying the position of standing waves may comprise a short-circuiting plunger movable along the axis of the first waveguide and adapted to terminate the first waveguide at a distance approximately equal to an even number of quarter guide wavelengths beyond the iris. Other means may be used, for example, the first waveguide may have a flexible terminating wall with means for producing slight axial movement of the order of a guide wavelength, or a fraction thereof.

It is preferred that the center of each iris is on the axis of the resonant cavity.

The center of the first iris is preferably displaced from the longitudinal center line of the broad face of the first waveguide by a distance of up to a quarter of the width of the broad face of the first waveguide and preferably between one eighth and one quarter of the width of the said face. Each iris is preferably circular, but may be of another shape.

A number of arrangements may be provided whereby the cavity is coupled to the two guides in two orthogonal modes respectively. For example, each of the waveguides may have two relatively broad faces and two relatively narrow faces, the iris coupling one of the waveguides to the cavity being in a broad face of the waveguide, and the other iris being in a narrow face of the other waveguide. Alternatively, both irises can be mounted in broad faces of the waveguides, either with one waveguide mounted at right angles to the other, or with the waveguides parallel to each other and one of the irises displaced to one edge of the face in which it is located.

In operation, one of the waveguides may be fed with a radio frequency (R.F.) signal and the tuning element may rotate to adjust the two orthogonal modes in the cavity to be driven in phase by the R.F. input.

There may also be provided means for rotating the plana of polarization of the R.F. field fed into the resonant cavity to adjust this to be orthogonal with an output R.F. field produced in the second waveguide by the output iris. These means may be provided as set out in the second aspect of the invention.

Figure 1:
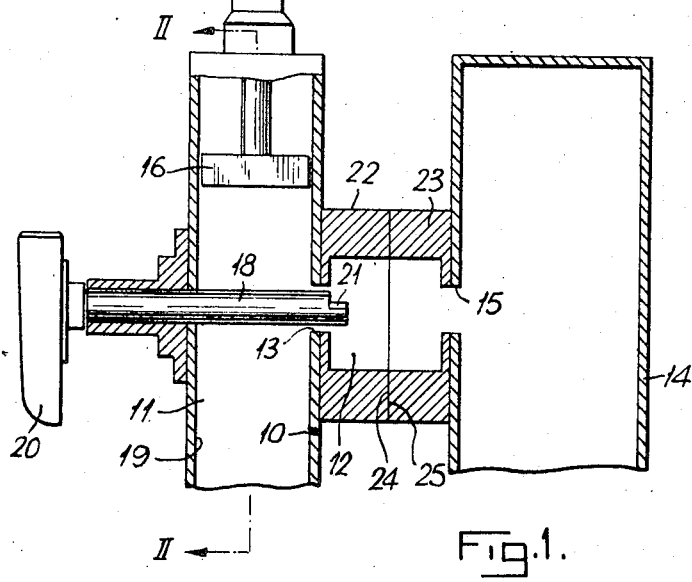

An embodiment of the invention will now be described by way of example with reference to the accompanying drawings in which:

FIG. 1 is a longitudinal section through a waveguide coupling device embodying the invention; and FIG. 2 is a section along the lines II — II in FIG. 1.

Referring to FIGS. 1 and 2, a first waveguide 11 is of rectangular cross-section and is coupled to a cylindrical, bimodal cavity resonator 12 by an iris 13 in one broad face 10 of the waveguide. A second rectangular waveguide 14 is coupled by an iris 15 in one of the narrow faces thereof to the other end of the cavity 12, the two irises being co-axial but the iris 13 being displaced slightly from the longitudinal center line of the broad face 10 as shown in FIG. 2. The dimensions of the waveguides and the cavity 12 are made such that the two waveguides are isolated unless there is some phenomenon in the cavity 12 which produces rotation of the R.F. field in the cavity. In the end of the waveguide 11 beyond the iris 13 is a short circuiting plunger 16 movable along the axis of the waveguide 11 by a manual drive knob 17 carrying a vernier scale. A dielectric rod 18 is mounted in the other wide face 19 of the waveguide 11 and passes along the axis of the cavity 12 through the iris 13 into the cavity 12. The rod 18 is rotatable by a manual knob 20, (also calibrated), and carries a flat 21 to produce a departure from a circular cross-section.

In practice, the cylindrical resonant cavity 12 may operate in the $TE_{111}$ mode, coupling orthogonally to radio-frequency magnetic fields in the input and output guides 11 and 14 by way of the two axially placed circular irises 13 and 15. If the input waveguide 11 is terminated an even number of quarter guide wavelengths beyond the iris 13, and the waveguide 14 is terminated an odd number of quarter guide wavelengths beyond the iris 15, the R.F. field fed into the cavity will be orthogonal with the output mode of the waveguide 14 so that there is no coupling between the two waveguides 11 and 14. Although the guides 11 and 14 are referred to as input and output guides by way of example, the input and output are interchangeable without alteration to the structure.

In order to ensure that the coupling of the cavity 12 to the two waveguides 11 and 14 is exactly orthogonal, means are provided to rotate the plane of polarization of the R.F. magnetic field feeding the cavity through the iris 13. The rotation is produced by the movable short circuiting plunger 16 which terminates the waveguide 11 of FIG. 1 at about one half guide wavelength from the feeding iris. In order to produce the rotation, the waveguide 11 is attached to the cavity 12 in such a way that the center of the coupling iris 13 (which lies on the axis of the cavity 12) is slightly displaced from the center line of the broad face 10 of the waveguide 11. It can be seen from FIG. 2 that the angle of the tangent to the R.F. standing wave in the guide 11 will vary, as seen by the iris, as the position of the standing wave is varied by movement of the plunger 16. Thus a relatively large displacement of the short circuiting plunger 16 causes a very small rotation of the plane of polarization of the R.F. magnetic field fed to the resonant cavity 12, easily allowing fine adjusting (of order of ten seconds of arc or better).

As has been mentioned, the coupling device of FIG. 1 is useful for measuring any phenomenon in the cavity 12 which produces rotation of the R.F. field in the cavity and so gives an output field at one iris. To achieve this it is necessary to ensure that there are two orthogonal modes in the cavity which will be driven in phase (having the same resonant frequency) by the R.F. magnetic field feed. This ensures that there is no coupling through the output iris 15 since the cavity R.F. magnetic field is then parallel to the R.F. magnetic field feed which is made accurately orthogonal to the output R.F. field using the adjustment provided by the plunger 16. It is to be noted that these two modes need not be at 45° to the R.F. field feed in contrast to previously held theory. That is to say that the two orthogonal fields in the cavity need not have the same Q factor, but must have the same frequency. This is done by inserting the rotatable dielectric rod 18 through either coupling iris parallel to the cavity axis, and projecting slightly into the cavity 12. The cross-section of the rod 18 departs slightly from a circle, and so large rotations of the rod 18 alter the cavity dimensions very slightly, owing to the interaction of the fringe electric field with the dielectric. The amount of correction available for the ellipticity of the cavity can be varied by the insertion of the rod, and the cavity can be tuned by the same rod if desired.

By way of example, a coupling device as shown produced as a laboratory model has been found to give the following results. The cavity was resonant at 10.4 GHz with a Q factor of 6,000 and the rejection was measured to be greater than 110 db. This was limited by mechanical flexing of the structure and receiver sensitivity, since at this level the device will double its output for a relative mechanical rotation of the waveguides of less than five seconds of arc, or a movement apart of the two halves (to be described below) of the cavity of around 1,000A. It is estimated that better mechanical construction would allow greater rejections to be obtained.

The cavity of the model referred to was made of brass in two halves allowing the device to be divided vertically through the center of the resonant cavity, perpendicular to the cylindrical axis of the cavity. This disturbs no current lines for the $TE_{111}$ mode and leaves the Q of the cavity unaltered. It also gives access and allows samples to be placed in this plane for applications of the device. Two brass blocks 22 and 23 slightly thicker than half the finished inside length of the cavity cylinder were then each bored out to form half the cavity, the mating faces 24 and 25 were machined flat, and the coupling irises drilled accurately concentric with the cavity axis. The blocks were then fitted with guide pins to ensure alignment of the two half cavities when bolted together. In this way, departures from cylindrical symmetry for the cavity may be made very small. The waveguides were attached to the blocks with solder.

Devices embodying the invention find a number of uses due to the ability to give an output from any phenomenon in the cavity which rotates the field therein.

For example, the device may provide a resonator for electron paramagnetic resonance and electron spin resonance measurements.

Further, the device may form an amplitude or phase pulse microwave modulator. Such a device is suitable for direct modulation at microwave frequencies at pulse rates up to about 1 Mbit. This is achieved by inserting a Hall plate into the cavity to rotate the plane of polarization by ±90 percent. The insertion loss may be 1 or 2 db. Such a modulator finds use in low cost microwave PCM systems. In this form the device can also be used a a reasonably high speed (less than 1 microsecond) microwave switch with high isolation. The switching speed is limited by the cavity Q to something of order 200 nS, but the on/off ratio can be 100 db. This would be adequate for receiver protection in many high power pulsed systems.

It is also possible to measure the Hall coefficient and resistivity of samples placed within the cavity without attaching any leads, since the asymmetric conductivity tensor of the sample means that the plane of polarization of the wave in the cavity is rotated. A Gunn oscillator coupled to such a resonator enables such measurements to be made fairly easily.

The same sort of system also offers possibilities for a fast sensitive optical detector, where the light is incident on a specimen such as PbSnTe within the cavity, and the resulting change in electrical properties causes a microwave output.

In a further application, a PIN diode switch may be placed halfway (an odd number of quarter guide wavelengths) between the offset feeding iris and the terminating wall represented by the plunger. The position of the reflection can then effectively be changed very rapidly by energizing the switch electrically, thus altering the plane of polarization of the feed. This enables a phase modulator or switch to be constructed which is greatly superior to the PIN diode switch on its own (typically 30 db).

We claim:

1. A waveguide coupling device comprising first and second waveguides, a resonant cavity coupled at one end thereof to the first waveguide by a first iris in a face of the waveguide, and coupled at the other end of the cavity to the second waveguide by a second iris in a face of the waveguide, the arrangement being such that the resonant cavity is coupled to one of the waveguides in a mode which is orthogonal to the mode in which it is coupled to the other waveguide, and a tuning element passing into the cavity through one of the irises substantially along the axis of propagation of the cavity, the tuning element having a non-circular cross-section and being rotatable to allow adjustment of coupling between the two waveguides.

2. A waveguide coupling device as claimed in claim 1, in which the tuning element comprises a dielectric rod mounted co-axial with the axis of propagation of the cavity and having a cross-section which departs from a circular cross-section by a flat along a chord of the circle.

3. A waveguide coupling device as claimed in claim 1, in which the tuning element comprises a dielectric rod mounted co-axial with the axis of propagation of the cavity and having an elliptical cross-section.

4. A waveguide coupling device as claimed in claim 1, in which the tuning element comprises a dielectric strip mounted co-axial with the axis of propagation of the cavity and having a rectangular cross-section.

5. A waveguide coupling device comprising a first waveguide having a pair of relatively broad opposite faces and a pair of relatively narrow opposite faces, a resonant cavity coupled at one end thereof to the first waveguide by a first iris in a broad face of the first waveguide, a second waveguide coupled to the other end of the cavity by a second iris in a face of the second waveguide, and means for varying, in operation, the position of the standing waves along the axis of the first waveguide relative to the first iris, the center of the first iris being displaced from the longitudinal center line of said broad face of the first waveguide in such a manner that displacement of the standing waves along the axis of the first waveguide causes rotation of the plane of polarization of a field fed into the cavity through the first iris.

6. A waveguide coupling device as claimed in claim 5, in which the means for varying the position of the standing waves comprises a short-circuiting plunger movable along the axis of the first waveguide and adapted to terminate the first waveguide at a distance approximately equal to an even number of quarter guide wavelengths beyond the iris.

7. A waveguide coupling device as claimed in claim 5, in which the first waveguide has a flexible terminating wall adapted to terminate the first waveguide at a distance approximately equal to an even number of quarter guide wavelengths beyond the iris and means for producing axial movement of the terminating wall through a distance of up to a guide wavelength.

8. A waveguide coupling device as claimed in claim 5, in which the center of the first iris is displaced from said longitudinal center line by a distance of up to a quarter of the width of the broad face of the first waveguide.

9. A waveguide coupling device as claimed in claim 8, in which the center of the first iris is displaced from said longitudinal center line by a distance between ⅛ and ¼ of the width of the broad face of the first waveguide.

10. A waveguide coupling device as claimed in claim 5, in which the second waveguide has two relatively broad faces and two relatively narrow faces and the second iris is in one of said relatively narrow faces.

* * * * *